US008483741B1

(12) United States Patent
Hussain et al.

(10) Patent No.: US 8,483,741 B1
(45) Date of Patent: Jul. 9, 2013

(54) MITIGATION OF INTER-NETWORK INTERFERENCE TO ENABLE CHANNEL REUSE

(75) Inventors: Syed Adil Hussain, Cupertino, CA (US); Celestino Anastasio Corral, Ocala, FL (US); Gregory Allen Magin, Ocala, FL (US); Kianian-Fard Nozar, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 12/772,551

(22) Filed: May 3, 2010

(51) Int. Cl.
*H04W 4/00* (2009.01)

(52) U.S. Cl.
USPC .................. 455/522; 455/422.1; 370/445

(58) Field of Classification Search
USPC ............. 455/422.1, 434, 450–453, 13.4, 522, 455/127.1; 370/318, 445–448, 254–258; 375/316–352
See application file for complete search history.

(56) References Cited

U.S. PATENT DOCUMENTS

| 4,025,853 | A | 5/1977 | Addeo |
| 5,003,619 | A | 3/1991 | Morris et al. |
| 5,566,165 | A | 10/1996 | Sawahashi et al. |
| 5,623,486 | A | 4/1997 | Dohi et al. |
| 5,768,684 | A | 6/1998 | Grubb et al. |
| 5,787,352 | A | 7/1998 | Benveniste |
| 5,987,333 | A | 11/1999 | Sole |
| 6,643,272 | B1 | 11/2003 | Moon et al. |
| 6,985,456 | B2 | 1/2006 | Gaskill et al. |
| 2002/0010870 | A1 | 1/2002 | Gardner |
| 2002/0065094 | A1 | 5/2002 | Schmutz et al. |
| 2002/0105925 | A1 | 8/2002 | Shoemake |
| 2002/0123357 | A1 | 9/2002 | Abrishamkar et al. |
| 2003/0108131 | A1* | 6/2003 | Lopez et al. ................. 375/345 |
| 2003/0184433 | A1 | 10/2003 | Zalitzky et al. |
| 2003/0193907 | A1 | 10/2003 | Rezaiifar et al. |
| 2005/0129051 | A1* | 6/2005 | Zhu et al. ...................... 370/445 |
| 2007/0242621 | A1* | 10/2007 | Nandagopalan et al. ..... 370/254 |
| 2011/0014910 | A1* | 1/2011 | Yonge et al. ................. 455/434 |

OTHER PUBLICATIONS

Fish & Richardson P.C., Unpublished Application filed in U.S. Appl. No. 12/505,773, filed Jul. 20, 2009, 25 pages.
Kim, Tae-Suk et al., "Improving Spatial Reuse through Tuning Transmit Power, Carrier Sense Threshold, and Data Rate in Multi-hop Wireless Networks." Power point presentation, ACM MobiCom 2006, 24 pages.
Yang, Xue et al., "On the Physical Carrier Sense in Wireless Ad Hoc Networks." Technical Report, 2004. Univeristy of Illinois at Urbana-Champaign, pp. 1-13.

* cited by examiner

*Primary Examiner* — Kashif Siddiqui

(74) *Attorney, Agent, or Firm* — DeLizio Gilliam, PLLC

(57) ABSTRACT

Disclosed are systems and methods for configuring a station coupled to a communication medium. Received signal powers at the station of signals transmitted from a plurality of other stations coupled to the communication medium are measured. A transmit power level of the station, used for determining powers of signals transmitted from the station, is determined based at least in part upon the received signal powers. A detection threshold of the station, used for determining which received signals to accept for further processing and which received signals to ignore, is determined based at least in part upon the received signal powers.

37 Claims, 5 Drawing Sheets

POWERLINE COMMUNICATION
NETWORK CONFIGURATION

MITIGATION OF INTER-NETWORK INTERFERENCE TO ENABLE CHANNEL REUSE

BACKGROUND

This description relates to mitigation of inter-network interference to enable channel reuse.

Communications systems such as cellular communication systems, power line communication systems, and wireless local area network systems use electromagnetic signals to exchange information. Electromagnetic signals get attenuated and distorted as they propagate through media. In general, signal attenuation increases as the distance between a receiver and a transmitter increases. Signal distortion depends on the medium through which the signal propagates. In addition to getting attenuated and distorted, signals also get corrupted due to noise in the medium. Accordingly, in communication systems, a signal can only be properly received if the signal-to-noise ratio at the receiving station is high enough. The signal-to-noise ratio thus limits the range of separation between the transmitter and receiver for successful communication. For example, the range of electromagnetic signals in cellular networks is several miles while the range of signals in a WiFi system is a few hundred feet.

Communication signals that propagate on the same medium and which overlap in time and frequency may interfere with each other and prevent accurate reception at an intended receiver. In some cases overlap of communication signals on the medium can be tolerated if the power level of the desired signal at the intended receiver is large enough in relation to the power level of any interfering signals at the receiver. For example, cellular networks may use a priori knowledge of the geographic positions of base stations to reuse the transmission frequencies in two cells that are sufficiently distant from each other for interference between the two cells to be tolerable. This allows those stations to reuse overlapping frequency channels without coordinating their transmissions. Alternatively, the medium may be shared by coordinating transmissions to avoid overlap in time or frequency.

For example, power line communications utilize existing wired infrastructure in homes and buildings to provide high throughput multimedia connectivity. As the market continues to grow for this technology, its challenges must be successfully addressed to meet practical as well as regulatory requirements. One such problem is the efficient use of the wired medium in a multiple dwelling unit (MDU) scenario. Deployment of multiple uncoordinated and independent networks on a common medium results in random collisions. A solution to this problem is to coordinate the networks and have them share the medium's resources equally. Using this approach the throughput of each network is reduced in proportion to the number of neighboring networks but collisions are avoided.

SUMMARY

In one aspect, in general, a method of configuring a station coupled to a communication medium includes measuring received signal powers at the station of signals transmitted from a plurality of other stations coupled to the communication medium. The method further includes determining a transmit power level of the station, used for determining powers of signals transmitted from the station, based at least in part upon the received signal powers. The method further includes determining a detection threshold of the station, used for determining which received signals to accept for further processing and which received signals to ignore, based at least in part upon the received signal powers.

Aspects can include one or more of the following features. The method may further include identifying a subset of fewer than all of the plurality of other stations as being associated with the same logical network as the station. Determining the detection threshold of the station may include determining a threshold that will cause the station to accept signals transmitted from stations in the subset and ignore signals transmitted from stations outside the subset. Determining the detection threshold of the station may include selecting the detection threshold from a set of possible thresholds such that the lowest threshold from the set that will cause the station to ignore signals transmitted from stations outside the subset is selected. The method may further include comparing a first signal power, corresponding to a minimum received signal power from among stations in the subset, to a second signal power, corresponding to a maximum received signal power from among stations outside of the subset. The method may further include setting the transmit power level to a predetermined value if the first signal power is less than a value determined based at least in part upon the second signal power. The method may further include setting the detection threshold to a predetermined value if the first signal power is less than a value determined based at least in part upon the second signal power. The method may further include setting the transmit power level to a value that is lower than a predetermined value if the first signal power is greater than a value determined based at least in part upon the second signal power. The method may further include setting the detection threshold to a value based on at least one of the received signal powers if the first signal power is greater than a value determined based at least in part upon the second signal power. The difference between the first signal power and the second signal power may be compared to a safety margin. The safety margin may be a predetermined constant. Alternatively, the safety margin may be the maximum difference between the first signal power and the second signal power from prior measurements of received signal powers at the station. Some calculations required to determine the detection threshold may be performed on one or more processing devices located in another station that serves as a central coordinator for the logical network. The method may further include transmitting information reflecting the measured received signal powers from the station to another station that serves as a central coordinator for the logical network. Determining the transmit power level may include selecting the transmit power from a set of possible levels such that the lowest level from the set that will allow the station to transmit to all the other stations in the subset at the highest data rate provided in a network protocol is selected. Measuring a received signal power may include measuring the signal power of a regularly repeated beacon received from one of the plurality of other stations. Measuring a received signal power may include measuring the signal power of a preamble portion of a physical layer protocol data unit. Measuring a received signal power may include measuring the signal power of a portion of a physical layer protocol data unit received after a predetermined symbol transition is detected. Measuring a received signal power may include saving an automatic gain control freeze value used in reception of a physical layer protocol data unit. Measuring a received signal power may include measuring a received signal to noise ratio. The method may further include transmitting a signal from the station using the transmit power level, wherein the signal is compliant with a contention based medium access control protocol. The method may further include receiving a signal at the station using the detection threshold, wherein the signal is compliant with a contention based medium access control protocol. The method may further include receiving at the station from another station multiple candidate values for the transmit power level, where the transmit power level is determined by selecting one of the candidate values. The method may further include receiving at the station from another station multiple candidate values for the detection threshold, where the detection threshold is determined by selecting one of the candidate values.

In another aspect, in general, an apparatus includes a receiver configured to receive communication signals from a communication medium and to measure the received signal powers of signals transmitted by a plurality of other stations coupled to the communication medium. The receiver is configured to determine a detection threshold, used for determining which received signals to accept for further processing and which received signals to ignore, based at least in part upon the received signal powers. The apparatus further includes a transmitter configured to transmit communication signals onto the communication medium with powers based on a transmit power level that is determined based at least in part upon the received signal powers.

In another aspect, in general, a communication system includes a receiver configured to measure received signal powers at a station of signals transmitted from a plurality of other stations coupled to the communication medium. The communication system further includes one or more processing devices configured to determine a transmit power level of the station, used for determining powers of signals transmitted from the station, based at least in part upon the received signal powers. The one or more processing devices are also configured to determine a detection threshold of the station, used for determining which received signals to accept for further processing and which received signals to ignore, based at least in part upon the received signal powers.

Among the many advantages of the invention (some of which may be achieved only in some of its various aspects and implementations) are the following.

By ignoring signals whose preamble signal strength is below a predetermined detection threshold, reuse of a communication medium can be improved in some cases. For example, a signal encoding a frame may be strong enough for its preamble and frame control information to be detected, but weak enough for its following data payload to not interfere with other transmissions. Additionally, other information, including information within the frame control, can be combined with signal strength information to make decisions about which signals to ignore and about when those signals should be ignored.

By controlling the transmit power level of stations sharing a communications medium the interference between networks can be reduced. This results in higher carrier-to-interference for the in-network traffic and can also result in less threshold adjustments so that detection of distant nodes within the same network is not compromised.

Other features and advantages of the invention will become apparent from the following description, and from the claims.

DESCRIPTION

Figure 1:
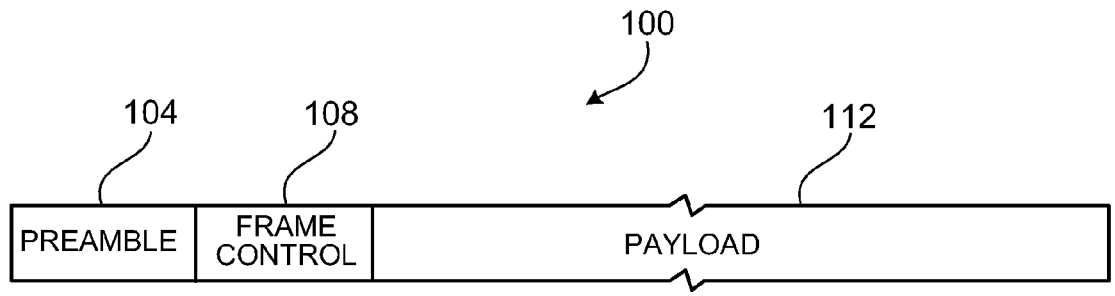
FIG. 1 is a schematic of an example PHY protocol data unit of a communication signal.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Electromagnetic signals have a limited range of propagation over various types of communication media. The limited range can be used to facilitate simultaneous use, i.e., "reuse," of the medium by communication stations that are outside the range of each other. For example, a cellular system can use a frequency planning mechanism for enhancing simultaneous use of frequency channels. The cellular system is geographically divided into cells, each served by a fixed transmitter station, known as a base station. A group of cells form a cluster, each covering a predetermined geographical area. The size of the cluster depends on the range of the electromagnetic signals. Each cell in the cluster uses a unique frequency band for transmissions. Cells at the same relative geographical location in each cluster reuse the same frequency band.

The techniques and systems described herein can be used in a variety of communication networks using different types of communication media. The media can include wired media such as those found in coaxial cable networks, phone line based networks and power line networks, and can include wireless media such as electromagnetic waves propagating between transmitting and receiving antennas. The techniques and systems can also be used across different type of networks, and across multiple networks. For example, in a home unit where both a coaxial network and a power line based network are deployed, it is possible for communication signals from the power line network to leak in to the coaxial network or vice versa. Accordingly, the coaxial network and power line based network can use the techniques and systems described herein, for example, to enhance spatial reuse of channels within the respective networks.

In power line communication networks the communication medium is a power line that is also used for electric power transmission. For example, power line communication networks use existing electrical wiring and outlets in a home or small business to connect PCs, broadband modems, set-top boxes, gaming consoles, audio/video players, flat screen displays, security cameras and other electronics devices.

In some examples, power line communication networks can be patterned on a layered communication network model, such as, the seven-layer open systems interconnection (OSI) network model adopted by International Telecommunication Union (ITU) as a standard. The seven layers include a physical layer (PHY), data link layer, network layer, transport layer, session layer, presentation layer, and application layer. The PHY is a fundamental layer that concerns the physical implementation of the communication network. The physical layer interfaces with the data link layer to encapsulate communication data for transmission over the power line medium. The data link layer includes a media access control (MAC) sublayer for providing addressing and channel access control mechanisms to enable communication between the various stations in the power line communication network. The PHY organizes communication data from the higher levels into bit stream data units known as PHY protocol data units (PPDU) for transmission over the power line medium.

Referring to FIG. 1, an example format of a PPDU 100 includes a preamble 104, a frame control portion 108 and payload 112. In some implementations, the preamble 104 includes a predetermined pattern that is used to demarcate the start of the PPDU 100. For example, the preamble 104 can be a repeating pattern of symbols. In some implementations, the symbols are Orthogonal Frequency Division Multiplexing symbols where each symbol includes a number of orthogonal sinusoidal carrier waveforms over the same symbol length, where each waveform includes an integral number of cycles over the symbol length, as described in more detail in U.S. Publication No. US 2006/0256883 (A1), incorporated herein by reference.

Figure 2:
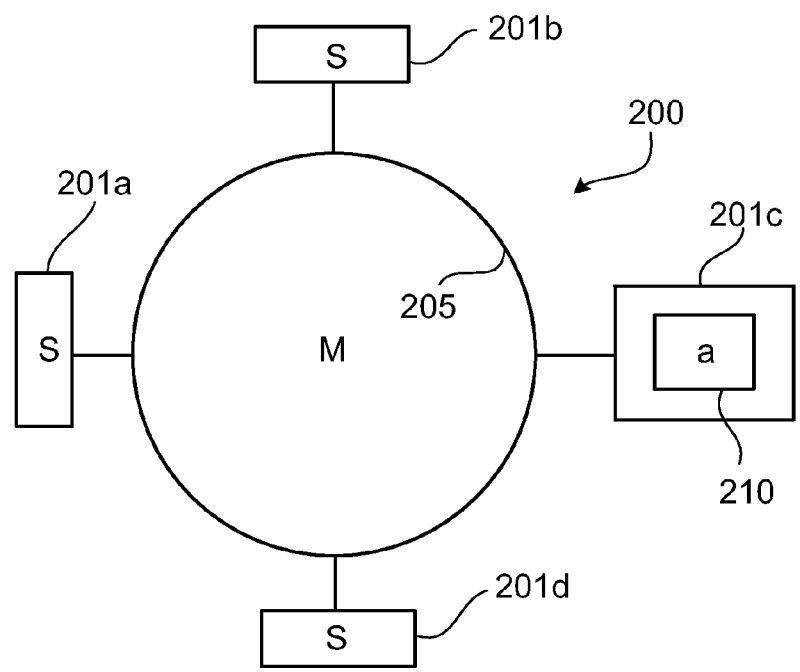
FIG. 2 is an example power line communication network configuration.

FIG. 2 is a schematic of an example power line communication network 200 having a plurality of stations 201a-d (generally 201). The stations 201 are each configured to transmit and receive data over the power line medium 205. The stations 201 may be referred to as a transmitter or receiver station with respect to a given transmission depending on whether the station 201 is transmitting or receiving data. However, each station 201 can be configured to include both transmitter circuitry and receiver circuitry, and in some implementations, transceiver circuitry is shared by both transmitter and receiver functionality.

In some examples, a station detects a received signal based on recognition of a preamble that includes a predetermined sequence of symbols. In order to detect the sequence of signals, the station is typically configured to use a predetermined detection threshold to ensure that signals that meet the criteria imposed by the detection threshold are detected, while signals that do not meet the criteria can be discarded. The detection threshold can be used in combination with other criteria to determine whether a signal will continue to be processed or will be discarded. In some implementations, a station determines whether detection criteria are met based on at least an initial portion of the preamble, and in some implementations, a station determines whether detection criteria are met based on detecting and analyzing information in the received signal. The station 201 then establishes the detection threshold based on signal strength information and optionally other information, as described in more detail below. Accordingly, in some examples, the signal strength information for a received signal can include detected signal values for the received signals and/or other information indicative of signal robustness.

In some implementations, a receiver amplifier 210, having gain a, is used in a station 201 to regulate a received signal to achieve a satisfactory signal-to-noise ratio. The station 201 can use the preamble 104 of the PPDU 100 to adjust the gain of a receiver amplifier 210 at the station. A process known as automatic gain control (AGC) can be used by the station 201 to adjust the gain of the receiver amplifier 210. AGC enables the station 201 to minimize noise levels in a received communication signal and regulate the signal's strength such that an appropriate signal-to-noise ratio is achieved. Once the appropriate AGC setting for receiving the signal is determined, the station 201 freezes (or locks) the gain of the receive amplifier 210 for the remainder of the PPDU 100. The locked gain setting of the receiver amplifier 210 for receiving the PPDU 100 is called "AGC freeze value." In some examples, the AGC freeze value can be a good indicator of the signal strength of the signal received at the station 201. For example, a high AGC freeze value can indicate low received signal strength. Alternatively, other techniques can be used to determine the signal strength of a received signal. For example, the signal energy within the preamble can be measured to provide a value that is compared to a detection threshold. In another example, error vector magnitudes of symbols in a received signal in relation to the estimated symbol constellation may be tracked to approximate the Signal to Noise Ratio (SNR) of the received signal. The SNR of the signal is a useful indicator of the signal strength of the received signal.

Figure 3:
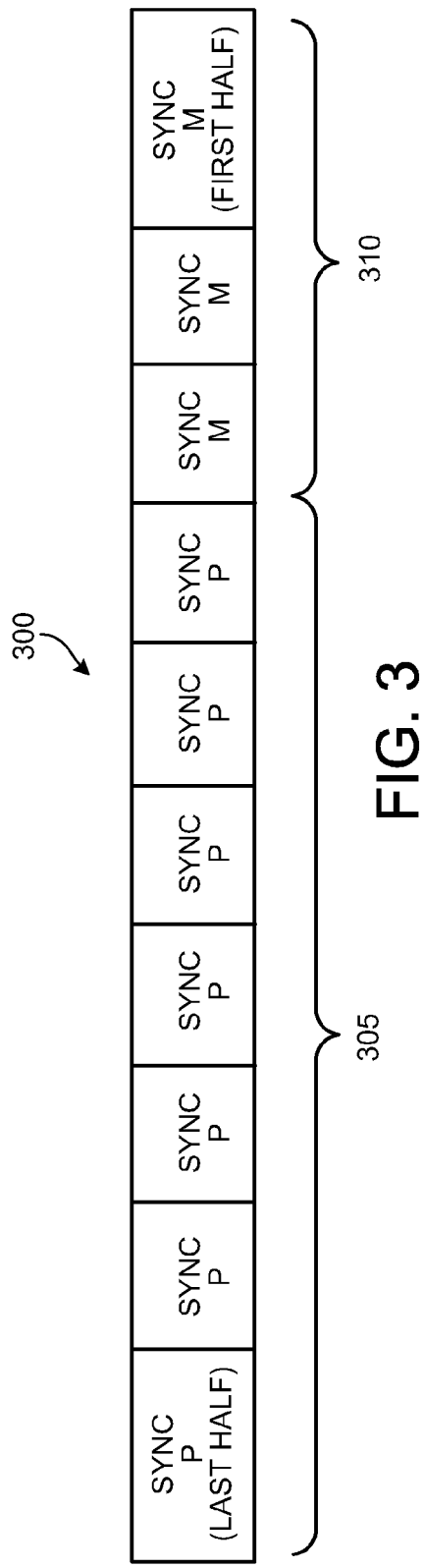
FIG. 3 is a schematic of an example preamble pattern.

FIG. 3 illustrates an example preamble pattern 300 that can used by power line communication systems for the preamble 104 of PPDU 100. As shown, the preamble pattern 300 consists of 7.5 SYNCP symbols 305 followed by 2.5 SYNCM symbols 310. The SYNCM symbols 310 are generated by shifting the phases of the respective carrier waveforms that make up the SYNCP symbols 305 by 180 degrees. The preamble pattern 300 can be used by a station to determine the start of the PPDU 100 in a received signal. In some examples, the preamble 104 is detected by a symbol correlation module (not shown) in the receiver station that performs the following two symbol correlation tests for initial preamble signal detection (e.g., for carrier sense, and/or determining a detection threshold).

For the first symbol correlation test, the symbol correlation module correlates different portions of a received communication signal that are separated by one SYNCP symbol length to determine if adjacent symbols in the received signal match each other. Since a preamble pattern 300 consists of several SYNCP signals 305, a high degree of correlation is expected between these portions of adjacent symbols when a preamble pattern 300 is present in the signal. Further, since SYNCM symbols 310 are generated by shifting the SYNCP signals 305 by 180 degrees, a large negative correlation is also expected using this first test for the SYNCP symbol 305 to SYNCM symbol 310 transition of the preamble 300. Accordingly, a transition in large positive correlation to large negative correlation can be used by the station to determine the timing of the preamble 300.

For the second symbol correlation test, the symbol correlation module correlates symbols in a received communication signal with a stored SYNCP symbol 305 pattern to determine if a symbol in the received signal matches the stored SYNCP symbol 305. Since the preamble pattern 300 includes SYNCP symbols 305 identical to the stored SYNCP symbol 305, a high degree of correlation is also expected for this second test. Further, a high degree of negative auto correlation is expected when a SYNCM symbol 310 is detected in the signal. Accordingly, a degree of the correlation obtained from these correlation tests can be used to determine whether a preamble pattern 300 is detected in the received signal.

The degree of correlation for either of these correlation tests necessary to establish presence of a preamble pattern 300 in a signal is called "SYNC detection threshold." A high value of the SYNC detection threshold suggests that a high degree of correlation for a given correlation test is needed to establish the presence of the preamble pattern 300 in the signal. If both correlation tests yield correlation values higher than their respective thresholds, then the preamble 300 is considered to be detected for the purposes of determining the received signal strength (e.g., using the AGC freeze value). Alternatively, in some implementations, the receiver can wait until after the negative correlation corresponding to the SYNCP to SYNCM symbol transition is detected to determine the received signal strength. In some implementations, a receiver station can suppress the detection of the preamble pattern 300 of a communication signal from a distant transmitter station (i.e., a weak signal) by increasing its SYNC detection threshold for one or both of the correlation tests.

In some examples, the frame control portion 108 of a PPDU 100 (FIG. 1) includes MAC and PHY related control information such as the source and destination address of the PPDU 100, the network to which the source of the PPDU 100 (e.g., the transmitter station of FIG. 2) belongs, information necessary to demodulate the PPDU payload (e.g., modulation, code rate information), information regarding length of the PPDU 100, and channel access information.

In some examples, the payload 112 includes application level data and/or management messages. In some examples, the payload 112 may not be present in a PPDU 100 that only carry control information in, for example, the frame control portion 108 of the PPDU 100.

Power lines were originally designed for transmission of power at 50-60 Hz in many cases, and up to 400 Hz in some cases. Accordingly, power line media can present an electrically contaminated environment for communication signals. For this reason, in some examples, to ensure proper functioning of the power line communication system and reception of the payload 112, the preamble 104 and frame control portion 108 of the PPDU 100 are designed to be extremely robust.

However, because of the robustness of the preamble 104 and frame control portion 108 of a PPDU 100, in some examples, stations 201 in one network may detect signals from stations 201 in another network, thus affecting channel reuse. For example, a first receiver station in a home of a multi-dwelling unit can, in some instances, detect preambles 104 and frame control portions 108 of signals intended to be received by a second receiver station in another home of the multi-dwelling unit. Similarly, the second receiver station may detect preambles 104 and frame control portions 108 of signals intended to be received by the first receiver station. In some implementations, such detection of preambles 104 and frame control portions 108 of signals destined for other stations can be used to determine which signals can be ignored even if they are robust enough to be detected, to increase sharing of the power line medium.

Stations sharing a communication medium may be grouped into logical networks. A typical objective is to maximize communications throughput with other stations within a logical network that a station is affiliated with while minimizing unwanted interactions with other unaffiliated stations connected to the medium. When two or more logical networks transmit signals over a common communication medium, they are referred to as neighbor networks. For example, the stations in one dwelling of an MDU may be affiliated in a logical network that shares a power line medium with stations in another dwelling that are affiliated with a neighbor network.

Referring again to FIG. 2, in some examples, a station can use signal strength values corresponding to received signals to determine a detection threshold value for the station 201. The detection threshold value can be used to determine which of a plurality of received signals to accept for further processing, for example, for use in a contention based procedure (e.g., a CSMA/CA system) at the receiver station 205, and which of the plurality of received signals to ignore. The detection threshold can be a value that is compared to a measured signal strength of a received signal after the preamble of that received signal has been successfully detected. Alternatively, the detection threshold can correspond to one or both of the SYNC detection thresholds, in which case, the received signal is ignored without being successfully detected.

Figure 4:
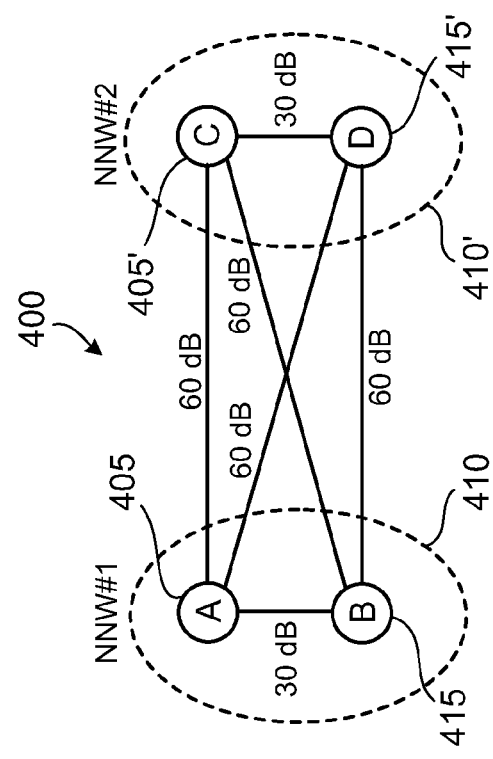
FIG. 4 is an example scenario of neighbor networks.

For example, referring now to FIG. 4, in scenario 400, stations 405 and 405' in a first neighbor network 410 and a second neighbor network 410', respectively, are separated by at least 60 dB of signal strength attenuation, while stations 405 and 415 in the first neighbor network 410 and stations 405' and 415' in second neighbor network 410' are separated by 30 dB of signal strength attenuation. Although only two neighbor networks 410 and 410' are shown, it should be understood that the techniques and systems in this description can be used for any number of neighbor networks 410, 410'.

Assuming the noise level at each station is low, all stations in the first neighbor network 410 and the second neighbor network 410' can detect each other because to the robustness of the preambles 104 and frame control portions 108 of the signals. Accordingly, the first neighbor network 410 and the second neighbor network 410' share the medium.

However, since the signal strength levels of signals from e.g., the second neighbor network 410' are at least 30 dB below the signal strength levels of signals from within e.g., the first neighbor network 410, it is possible for the first neighbor network 410 and the second neighbor network 410' to operate independent of each other by using signal strength information, effectively doubling the capacity of each network's medium. For example, as described in detail below, signal strength information from the preambles 104 of the received signals can be used to exclude signals that are attenuated below a predetermined threshold value. In some examples, the signal strength information can be based on receiver stations' AGC freeze values, SYNCP symbol correlation values (e.g., either or both of the two correlation tests described above), estimated SNR, and/or based on other information that can be obtained from processing the preambles 104 of the received signals.

In some examples, the attenuation of signal strength between stations in a power line communication system depends on power line topology. Accordingly, it is possible that signal strength attenuation between stations in neighbor networks 410, 410' may not be large enough to allow full reuse of the power line medium.

Figure 5:
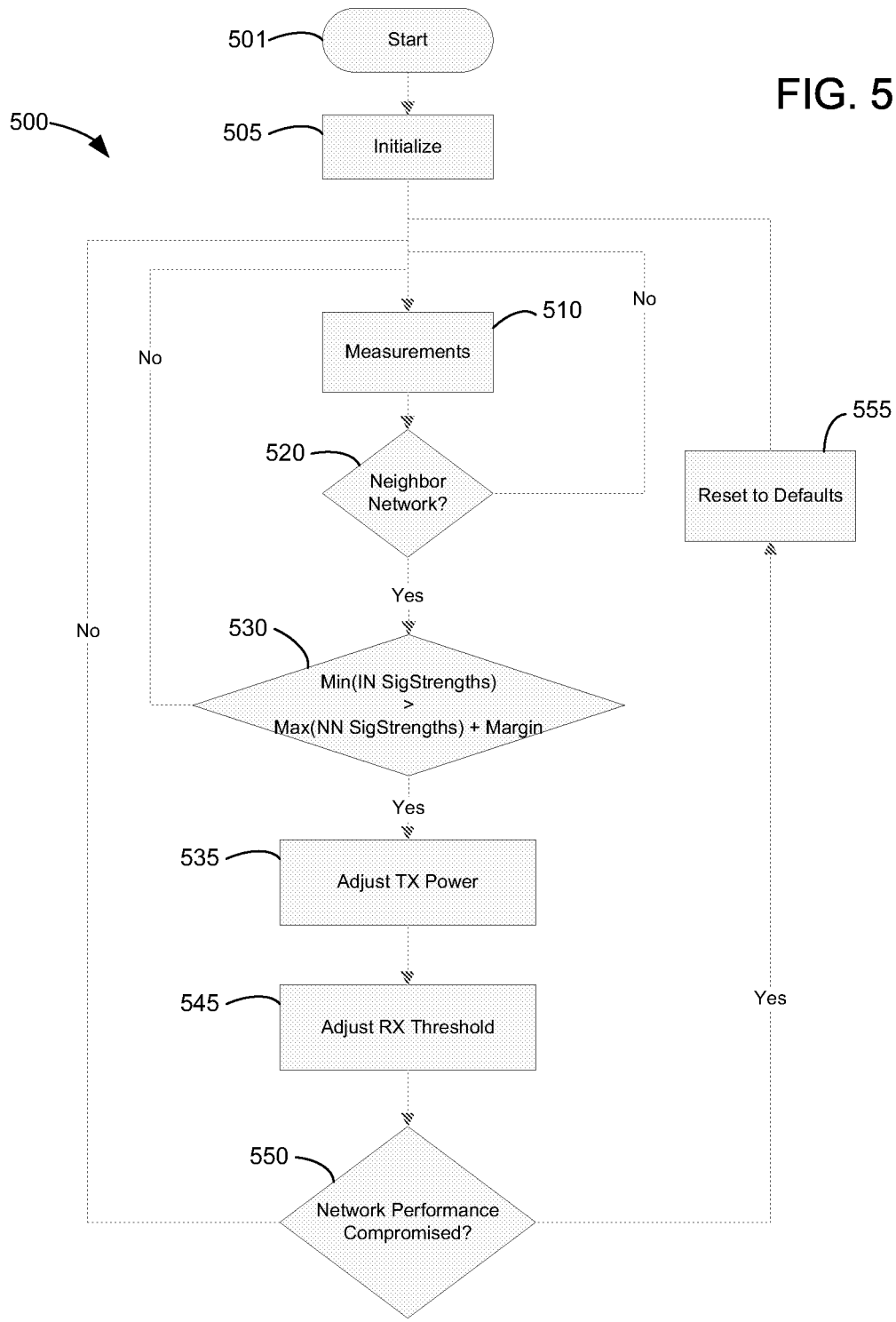
FIG. 5 is a flow chart of the configuration process for a station.

Stations connected to a communications medium may adapt to the topology and conditions of the medium by selectively adjusting a signal detection threshold and its transmit power level to allow channel reuse by neighbor networks. Referring to FIG. 5, the flow chart 500 depicts an exemplary procedure for configuration of neighbor network interference mitigation parameters in a station based on measurements of the signaling environment on the communication medium the station is connected to. The mitigation parameters can include a transmit power level used for determining powers of signals transmitted from the station (e.g., a baseline power level from which amplitudes of amplitude modulated signals can be determined), and a detection threshold used for determining which received signals to accept for further processing and which received signals to ignore.

Sometime after power-up of the station, the configuration of the station's interference mitigation parameters begins 501. The interference mitigation parameters are initialized 505 along with any intermediate state variables associated with the configuration. For example, a detection threshold may be set to a default value designed to facilitate robust reception of signals in the absence of interfering neighbor network devices. The station's transmit power level may also be set to a default value that is chosen to maximize the range of the transmissions while complying with a standardized protocol or regulatory requirements.

After initialization of parameters, measurements 510 of the signaling environment on the communications medium are collected over a suitable period of time. The station waits to receive signals from other stations that couple communication signals to the medium. For example, active stations may broadcast regularly repeated signals (e.g., special PDUs), called beacons. In some power line communication systems, beacons are transmitted at a designated phase in relation to a 50 or 60 Hz power cycle on the power line. Beacons identify the transmitting station and announce its presence to all other stations listening within range on the medium. Beacons may also include control signaling 108, including a network ID that specifies a logical network that the transmitting station is affiliated with. The duration of the measurement 510 may be chosen to ensure that all active stations will transmit at least one beacon during the measurement. In some cases multiple beacons from each station may be measured during the period and the corresponding average received signal strength for each station may be determined. Other PDUs besides beacons may also be used to measure signal strength of signals received from a station as long as they include control signaling 108 or some other means of indentifying the transmitting station. In some cases it may not be necessary to wait a full beacon signaling period before adjusting the interference mitigation parameters.

The measurements 510 may include local measurement of the received signal strengths at the local station in accordance with any of the methods described above, including AGC freeze values, SYNCP symbol correlation values, estimated SNRs, and/or based on other information that can be obtained from processing the preambles 104 of the received signals. The measurements 510 may also include measurements of signal strength for signals transmitted by the local station and received by remote stations. These measurements of outgoing signals are taken at the remote stations and relayed back to the local station through control signaling 108. The outgoing signal strengths may be conveyed back to the local station directly from the remote destination station that performed the measurement. The outgoing signal strengths may also be conveyed back to the local station via an intermediary station that collects signal strength measurements from all stations in a logical network. For example in certain power line networks each logical network is coordinated by a station called the central. The central may collect signal strength measurements from all stations in its network and periodically broadcast summaries of the point-to-point signal strengths achieved within the network.

After the measurements 510 are collected by the local station, the local station determines if a neighbor network has been detected 520. It makes this determination based on the network IDs in control signaling 108 of the signals detected during the measurement 510 period. If no stations affiliated with a neighbor network have been detected, then no adjustments are necessary and the local station performs another set of measurements 510 to continue to monitor the medium 205 for changing signaling conditions.

If a neighbor network is detected, then the station proceeds to assess whether the topology and signaling environment of the medium 205 are suited to interference mitigation. The minimum signal strength for remote stations within the local station's network is compared 530 to the maximum signal strength for remote stations affiliated with a neighbor network. A safety margin may be added to the maximum neighbor network signal strength before the comparison 530 to ensure robust reception of intra-network signals. The safety margin may be preselected based on the expected characteristics of the signaling environment. The margin may alternatively be determined during the configuration based on information specific to the particular medium 205. For example, the margin used may depend on the number of independent neighbor networks detected. In some implementations, the safety margin could be 0 dB.

If 530 the minimum in-network (IN) signal strength is greater than the maximum neighbor network (NN) signal strength plus any safety margin, then the stations proceeds to adjust the interference mitigation parameters. If not, then the mitigation parameters will stay the same and the station will proceed conduct another set of measurements 510 to monitor changing conditions on the medium 205.

The transmit power level of the station is adjusted 535 to a lower level to reduce interference with neighbor networks while still maintaining sufficient power to robustly transmit data to all stations within the its own logical network. In implementations where outbound signal strength data is collected from remote stations, the output power parameter may be set to a level just above the that required to transmit at full data rate to the furthest, in a network topological sense, station in the logical network. In implementations where only inbound signal strength measurements are collected, the transmit power level may be updated based on an imperfect approximation that the point-to-point signal paths between stations within the network are symmetric. In some implementations, the transmit power level may be adjusted downward in one or more defined steps until in-network performance is degraded. For example, point-to-point transmissions at each successive power level can be initiated with the furthest in-network station. The result of physical layer training sequence will include instructions from the remote station as to what modulation scheme should be used and thus what data rate was achieved. When the resulting data rate is below a desired threshold—such as the data rate achieved at the default max output power—the output power associated with the previous output power level step is selected. Alternatively, the range of defined steps may be searched in a different order, such as a binary search of the range, to find the minimum acceptable power level.

The signal detection threshold may be adjusted 545 based on inbound signal strength information so that signals from the neighbor network are ignored, while signals from stations within the same network are still robustly received. In some implementations, the detection threshold is increased in defined steps to gradually de-sensitize the detector to signals from other networks until signals from neighbor networks are all ignored. Alternatively the signal detection threshold may be adjusted before the transmit power level or the two parameters may be adjusted in parallel.

If adjustment of the interference mitigation results in a degradation of performance for any communications within the network 550, then the interference mitigation parameters are reset to the default values 555. In this case the station may also select to share the medium in a coordinated fashion with a neighbor network. A degradation in performance occurs when a point-to-point link within the network achieves a lower data-rate than a threshold for acceptable performance. Stations within a network may share information relating to a performance degradation through control signaling 108.

Figure 6:
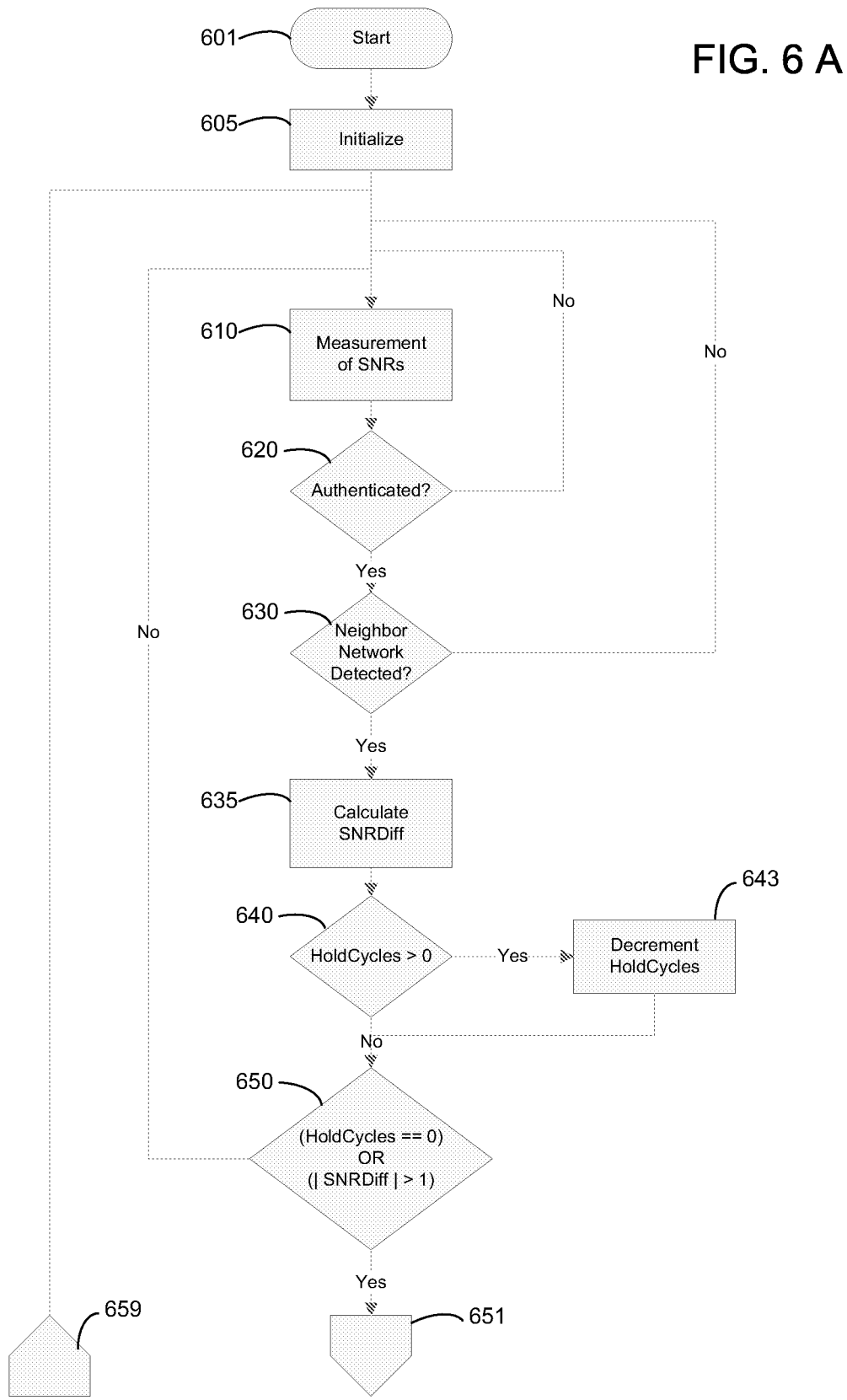
FIGS. 6A and 6B are a flow chart of the configuration process for a station.
Figure 6:
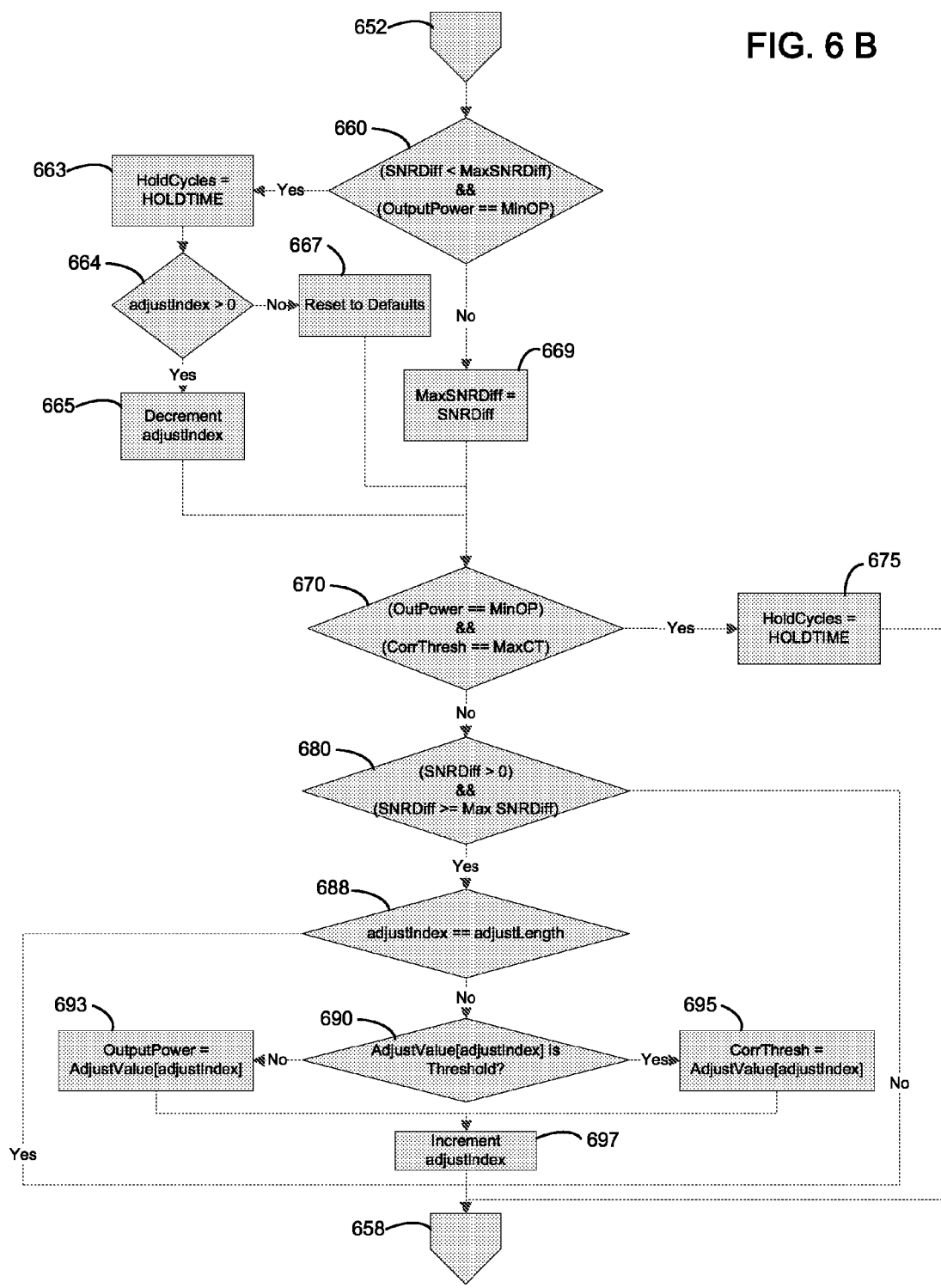

Referring to FIGS. 6A and 6B, a more detailed example of an implementation of station configuration is depicted in the flow chart that spans the figures. In the depicted implementation, the station independently adapts its parameters based on inbound signal strength information. In general, the other stations coupled to the medium could be independently adjusting their own parameters, such as transmit power and detection threshold, while the local station is adapting its parameters. The local station constantly monitors its signal strength measurements for signs of a detrimental change in the signaling environment.

Sometime after power-up of the station, the configuration of the station's interference mitigation parameters begins 601. The interference mitigation parameters are initialized 605 along with intermediate state variables associated with the configuration. A SYNCP correlation threshold (CorrThresh) may be set to a default value designed to facilitate robust reception of signals in the absence of interfering neighbor network devices. The station's transmit power level (OutPower) may also be set to a default value that is chosen to maximize the range of the transmissions while complying with a standardized protocol or regulatory requirements. The state variables adjustIndex, MaxSNRDiff, and HoldCycles are set to zero.

The variable adjustIndex is an index to an array of defined parameter values for the OutPower and CorrThresh. Each element in the array includes a value and a parameter type indicator. In this example, the type indicator is a flag with 0 corresponding to the output power level parameter and 1 corresponding to the correlation threshold parameter. In this implementation, OutPower is adjusted before CorrThresh and the one or more elements of the array of type output power occur in descending order in the front positions within the parameter array. The elements of type correlation threshold occur in ascending order thereafter out to adjustLenth, the length of the parameter array.

The array of candidate values for the transmit power level or for the detection threshold may be remotely programmed through control signaling from another device. For example, the station acting as the central coordinator in a power line network may remotely program the candidate values for transmit power level and detection threshold that may be used by a station in its logical network. In some implementations, the candidate values may be manually programmed by a network administrator using a remote device. Other parameters used in the selection of the transmit power level or the detection threshold, such as an SNR safety margin required for robust detection of in-network signals, may also be remotely programmed.

After initialization 605, the local station measures 610 the SNRs for detected incoming signals transmitted by various remote stations that couple their signals to the medium 205. In this implementation, the measurements are conducted over a predetermined period of approximately 2 minutes. SNR measurements from multiple PDUs, including beacons, for each remote station are averaged and the average SNR is used as the signal strength metric for the remote station. Control signaling 108 from the detected PDUs is used to identify the remote stations and determine their logical network affiliation.

Next the local station checks 620 whether it is currently affiliated, or authenticated, with a logical network. While the station is still searching for a network to join, it will keep using its default transmit power and correlation threshold to maximize the chance of finding a network. If it is not currently authenticated, the station will conduct another measurement of the regular duration.

Once the local station is authenticated with a logical network the station checks 630 to determine whether it has detected any neighbor networks. If no neighbor networks have been detected, then no adjustments are necessary and the station will conduct another measurement 610 to check for changes in the signaling environment.

If a neighbor network is detected 630, then measurement data is further analyzed 635 to determine the difference between the minimum average SNR for signals from an in-network (IN) station and the maximum average SNR for signals from a neighbor network (NN) station. This difference may then offset by a safety margin, such as 10 dB. The offset difference, min(IN_SNR)−max(NN_SNR)−margin, is stored as a variable called SNRDiff. In an alternative embodiment, the difference is offset by the previous maximum value of SNRDiff, stored in a state variable called MaxSNRDiff, instead of a fixed safety margin. Thus, the calculation 635 becomes SNRDiff=min(IN_SNR)−max(NN_SNR)−MaxSNRDiff. In this embodiment, the SNRDiff becomes an indicator of whether or not the signaling conditions on the medium 205 have degraded since the last adjustment.

Next the state variable HoldCycles is checked 640 to determine if an extended hold has been instituted. If HoldCycles is positive, it is decremented 643. If 650 there are no remaining hold cycles or the magnitude of SNRDiff exceeds a predetermined threshold, such as 1 dB, then a routine will be executed 651 to adjust the interference mitigation parameters. Otherwise, a new SNR measurement 610 will be taken.

Referring to FIG. 6B, the parameter adjustment routine begins 652 and checks 660 whether SNRDiff has decreased from its maximum previous value (MaxSNRDiff) and the OutPower is at the minimum value. When this condition occurs the station attempts to back-off the correlation threshold by one step to the previous stable value and hold 663 those parameter values for an extended period, such as 10 times the SNR measurement sample period, by setting the HoldCycles state variable. The back-off of the correlation threshold is accomplished by decrementing 665 the adjustIndex state variable when possible 664. If 664 the correlation threshold cannot be reduced, then resets 667 all the interference mitigation parameters to the default values, including the OutPower. The MaxSNRDiff parameter is updated 669 if 660 SNRDiff takes a higher value or the OutPower is still being adjusted.

Next the station checks 670 whether OutPower is already reduced to the minimum and the CorrThresh is already increased to the maximum defined values. If this state has been reached, then the station enters and extended hold phase by setting the HoldCycles state variable and returning 658 from the parameter adjustment routine.

If SNRDiff is positive and greater than or equal to the MaxSNRDiff 680 and adjustIndex is not equal to adjustLength 688, then an interference mitigation parameter is adjusted. Otherwise, it will simply return 658 from the parameter adjustment routine without taking the next defined step in the parameter search.

When a parameter adjustment is made, it first checks 690 the type of the parameter value to be adopted next. If the next adjustValue from the array is a transmit power level, then the parameter OutPower is updated 693. If the next adjustValue from the array is a correlation threshold, then the parameter CorrThresh is updated 695. In either case, adjustIndex is incremented 697, to point to the next candidate parameter value, before returning 658 from the parameter adjustment routine.

Referring back to FIG. 6A, after returning 659 from the parameter adjustment routine, a new SNR measurement 610 will be taken. In this manner the system continues to monitor changes in the signaling environment on the medium 205, during and after convergence of the interference mitigation parameters.

In some examples, referring to FIG. 4, the first neighbor network 410 and the second neighbor network 410' can be isolated from each other by having the stations set their detection threshold(s) to at least 20 dB below the signal strength level of the weakest signal (i.e., 30 dB of attenuated signal strength level) within each of the first neighbor network 410 and the second neighbor network 410'.

In some examples, each station 405, 415 in the first neighbor network 410 can collect signal strength level information for transmissions from various stations 405, 415 within the first neighbor network 410 and from stations 405', 415' within the second neighbor network 410', and process the signal strength information from all stations 405, 405' to determine the detection threshold at each of the other stations 405, 405'. In some examples, the signal strength level information may be processed at either a designated station in a network 410, e.g., a "master" station (not shown), or across multiple stations 405 by distributing the processing task in parallel or in serial among the stations 405.

In some examples, the stations 405, 405' in the first neighbor network 410 and second neighbor network 410' can be preconfigured with at least two detection thresholds values e.g., threshold_1, and threshold_2. In some implementations, threshold_1 can be used when no neighbor networks 410, 410' are detected, and threshold_2 can be used when at least one neighbor network 410, 410' is detected. In some implementations, threshold_1 can be used to detect and process signals from one neighbor network, e.g., network 410', and threshold_2 can be used to detect and process signals from another neighbor network (not shown). In some implementations, threshold_2 can be selected to provide isolation from neighbor networks 410' within a region where the stations 405 are installed, while maintaining communication between stations 405 belonging to the same network 410.

In some examples, each station 405 in a network 410 can maintain a table of the source address (SA), network ID (NID) information, and signal strength information for every transmission the station 405 receives from stations 405 within and stations 405' outside the station's network 410. In some examples, the stations 405 can then exchange this table of information with other stations 405 within and stations 405' outside the network 410 using management messages. In some examples, a master station can transmit the table of information to each station with a network 410.

Various techniques can be used to enhance performance of networks by determining conditions under which stations can simultaneously transmit and receive data. The methods and systems described herein can be used along with a variety of channel access mechanisms. For example, the techniques described in this description for reusing the channel can be used for CSMA traffic in a local network during TDMA allocations of neighboring networks and/or for TDMA traffic in a local network when the neighboring network has either TDMA allocations or CSMA traffic.

In a carrier sense multiple accesses with collision avoidance (CSMA/CA) system, stations that have data to transmit can use carrier sense to determine if there is an ongoing transmission. If an ongoing transmission is detected, the station can refrain from transmitting data until a current transmission is complete. When the current transmission is completed, the station transmits its data. In some examples, to avoid collisions between multiple stations that have data to send, a back-off mechanism can be used to spread the time at which various stations start transmission. This can reduce a chance that two stations start transmitting at the same time, thus reducing a probability of collision. In some examples, in networks operating using carrier sense multiple accesses with collision avoidance (CSMA/CA), if a station receives a signal having a preamble 104 and determines that the signal level of the preamble 104 is below the signal strength threshold required by the detection threshold, the station will ignore the signal and continue contending. However, if the received signal strength is above the signal strength required by the detection threshold, the station will consider the signal, stop contending and update its back-off parameters.

In a time division multiple access (TDMA) system, a station is provided with special time allocations when it can transmit data to one or more stations. Accordingly, the other stations can use the methods and systems described herein to determine if they can simultaneously transmit during this time allocation. For example, referring to FIG. 4, the TDMA allocations granted for transmissions from Station 405 to Station 415 can be reused for transmissions from Station 405' to Station 415'.

The techniques described above can be implemented using software for execution on computers located at the stations. For instance, the software forms procedures in one or more computer programs that execute on one or more programmed or programmable computer systems at a station (which may be of various architectures such as distributed, client/server, or grid) each including at least one processor, at least one data storage system (including volatile and non-volatile memory and/or storage elements), at least one input device or port, and at least one output device or port.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method comprising:
   receiving, at a station coupled to a communication medium, signals from a plurality of other stations coupled to the communication medium, the plurality of other stations including stations in a subset that are associated with a same logical network as the station and stations outside the subset;
   measuring received signal powers at the station of the received signals;
   determining a transmit power level of the station, used for determining powers of signals transmitted from the station, based at least in part upon the received signal powers; and
   determining, based at least in part upon the received signal powers, a detection threshold of the station, wherein the detection threshold of the station is used for determining which received signals to accept for further processing and which received signals to ignore.

2. The method of claim 1 further comprising:
   identifying the stations in the subset of the plurality of other stations that are associated with the same logical network as the station.

3. The method of claim 1 in which determining the detection threshold of the station comprises determining the detection threshold that will cause the station to accept signals received from stations in the subset and ignore signals received from stations outside the subset.

4. The method of claim 1 in which determining the detection threshold of the station comprises selecting a lowest threshold from a set of possible thresholds that will cause the station to ignore signals received from stations outside the subset.

5. The method of claim 1 further comprising:
comparing a first signal power, corresponding to a minimum received signal power from among stations in the subset, to a second signal power, corresponding to a maximum received signal power from among stations outside of the subset.

6. The method of claim 5 further comprising:
setting the transmit power level to a predetermined value if the first signal power is less than a value determined based at least in part upon the second signal power.

7. The method of claim 5 further comprising:
setting the detection threshold to a predetermined value if the first signal power is less than a value determined based at least in part upon the second signal power.

8. The method of claim 5 further comprising:
setting the transmit power level to a value that is lower than a predetermined value if the first signal power is greater than a value determined based at least in part upon the second signal power.

9. The method of claim 5 further comprising:
setting the detection threshold to a value based on at least one of the received signal powers if the first signal power is greater than a value determined based at least in part upon the second signal power.

10. The method of claim 5 in which the difference between the first signal power and the second signal power is compared to a safety margin.

11. The method of claim 10 in which the safety margin is a predetermined constant.

12. The method of claim 10 in which the safety margin is the maximum difference between the first signal power and the second signal power from prior measurements of received signal powers at the station.

13. The method of claim 1 in which some calculations required to determine the detection threshold are performed on one or more processing devices located in another station that serves as a central coordinator for the logical network.

14. The method of claim 1, further comprising:
transmitting information reflecting the measured received signal powers from the station to another station that serves as a central coordinator for the logical network.

15. The method of claim 1 in which determining the transmit power level comprises selecting a lowest transmit power from a set of possible levels that will allow the station to transmit to all the other stations in the subset at the highest data rate provided in a network protocol.

16. The method of claim 1 in which measuring a received signal power comprises measuring the signal power of a regularly repeated beacon received from one of the plurality of other stations.

17. The method of claim 1 in which measuring a received signal power comprises measuring the signal power of a preamble portion of a physical layer protocol data unit (PPDU).

18. The method of claim 1 in which measuring a received signal power comprises measuring the signal power of a portion of a physical layer protocol data unit (PPDU) received after a predetermined symbol transition is detected.

19. The method of claim 1 in which measuring a received signal power comprises saving an automatic gain control (AGC) freeze value used in reception of a physical layer protocol data unit (PPDU).

20. The method of claim 1 in which measuring a received signal power comprises measuring a received signal to noise ratio (SNR).

21. The method of claim 1 further comprising:
transmitting a signal from the station using the transmit power level, wherein the signal is compliant with a contention based medium access control protocol.

22. The method of claim 1 further comprising:
receiving a signal at the station using the detection threshold, wherein the signal is compliant with a contention based medium access control protocol.

23. The method of claim 1 further comprising:
receiving at the station from another station multiple candidate values for the transmit power level, where the transmit power level is determined by selecting one of the candidate values.

24. The method of claim 1 further comprising:
receiving at the station from another station multiple candidate values for the detection threshold, where the detection threshold is determined by selecting one of the candidate values.

25. A station for facilitating communications over a communication medium, comprising:
a receiver configured to receive signals from a plurality of other stations coupled to a communication medium, the plurality of other stations including stations in a subset that are associated with a same logical network as station and stations outside the subset;
the receiver further configured to measure received signal powers of the received signals, and to determine, based at least in part upon the received signal powers, a detection threshold, wherein the detection threshold of the station is used for determining which received signals to accept for further processing and which received signals to ignore; and
a transmitter configured to transmit communication signals onto the communication medium with powers based on a transmit power level that is determined based at least in part upon the received signal powers.

26. A system for configuring a station coupled to a communication medium, comprising:
a receiver configured to receive signals from a plurality of other stations coupled to the communication medium, the plurality of other stations including stations in a subset that are associated with a same logical network as station and stations outside the subset;
the receiver further configured to measure received signal powers of the received signals;
one or more processing devices configured to determine a transmit power level of the station, used for determining powers of signals transmitted from the station, based at least in part upon the received signal powers; and
one or more processing devices configured to determine, based at least in part upon the received signal powers, a detection threshold of the station, wherein the detection threshold of the station is used for determining which received signals to accept for further processing and which received signals to ignore.

27. The method of claim 1, wherein the stations in the subset are associated with a first logical network on the communication medium and the stations outside the subset are associated with a second logical network on the same communication medium.3

28. The station of claim 25 in which the receiver configured to determine the detection threshold of the station comprises the receiver being configured to determine the detection threshold that will cause the station to accept signals received from stations in the subset and ignore signals received from stations outside the subset.

29. The station of claim 25 in which the receiver configured to determine the detection threshold of the station comprises the receiver being configured to select a lowest threshold from a set of possible thresholds that will cause the station to ignore signals received from stations outside the subset.

30. The station of claim 25 further comprising:
the receiver further configured to compare a first signal power, corresponding to a minimum received signal power from among stations in the subset, to a second signal power, corresponding to a maximum received signal power from among stations outside of the subset.

31. The station of claim 30 further comprising:
the receiver further configured to set the detection threshold to a value based on at least one of the received signal powers if the first signal power is greater than a value determined based at least in part upon the second signal power.

32. The station of claim 25 in which some calculations required to determine the detection threshold are performed on one or more processing devices located in another station that serves as a central coordinator for the logical network.

33. The station of claim 25, further comprising:
the transmitter further configured to transmit information reflecting the measured received signal powers from the station to another station that serves as a central coordinator for the logical network.

34. The system of claim 26 in which the one or more processing devices configured to determine, based at least in part upon the received signal powers, the detection threshold of the station comprises the one or more processing devices being configured to determine the detection threshold that will cause the station to accept signals received from stations in the subset and ignore signals received from stations outside the subset.

35. The system of claim 26 in which the one or more processing devices configured to determine, based at least in part upon the received signal powers, the detection threshold of the station comprises the one or more processing devices being configured to select a lowest threshold from a set of possible thresholds that will cause the station to ignore signals received from stations outside the subset.

36. The system of claim 26 further comprising:
the one or more processing devices further configured to compare a first signal power, corresponding to a minimum received signal power from among stations in the subset, to a second signal power, corresponding to a maximum received signal power from among stations outside of the subset.

37. The system of claim 36 further comprising:
the one or more processing devices further configured to set the detection threshold to a value based on at least one of the received signal powers if the first signal power is greater than a value determined based at least in part upon the second signal power.

* * * * *